US012743481B2

(12) United States Patent
Wei et al.

(10) Patent No.: US 12,743,481 B2
(45) Date of Patent: Sep. 22, 2026

(54) TWO-STAGE FREQUENCY SELECTION METHOD AND DEVICE FOR MICROWAVE FREQUENCY SWEEP DATA

(71) Applicant: ZHEJIANG UNIVERSITY, Hangzhou (CN)

(72) Inventors: Zhenbo Wei, Hangzhou (CN); Jinyang Zhang, Hangzhou (CN); Jun Wang, Hangzhou (CN); Dongdong Du, Hangzhou (CN); Shaoming Cheng, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 988 days.

(21) Appl. No.: 17/966,915

(22) Filed: Oct. 17, 2022

(65) Prior Publication Data

US 2023/0048665 A1 Feb. 16, 2023

Related U.S. Application Data

(63) Continuation of application No. PCT/CN2021/096341, filed on May 27, 2021.

(30) Foreign Application Priority Data

Jun. 15, 2020 (CN) ......................... 202010542110.6

(51) Int. Cl.
*G06F 18/21* (2023.01)
*G01N 22/04* (2006.01)
(Continued)

(52) U.S. Cl.
CPC ............. *G06F 18/21* (2023.01); *G01N 22/04* (2013.01); *G06F 18/2451* (2023.01); *G06F 18/29* (2023.01); *G06N 20/00* (2019.01)

(58) Field of Classification Search
CPC .......... G06N 3/006; G06N 3/08; G06N 3/045; G06N 20/00; G06N 3/048; G06F 18/21;
(Continued)

(56) References Cited

U.S. PATENT DOCUMENTS 3,851,244 A 11/1974 Mounce
10,736,552 B2 * 8/2020 Ferber ................. A61B 5/0816

FOREIGN PATENT DOCUMENTS

CN 108169250 A 6/2018
CN 109632832 A 4/2019
(Continued)

OTHER PUBLICATIONS

Moomen, Abdelniser et al. ("Reducing Sweeping Frequencies in Microwave NDT Employing Machine Learning Feature Selection." Sensors (Basel, Switzerland) vol. 16,4 559. Apr. 19, 2016 Abstract, Introduction (Year: 2016).*
(Continued)

*Primary Examiner* — Abdullah Al Kawsar
(74) *Attorney, Agent, or Firm* — Wiersch Law Group

(57) ABSTRACT

Disclosed is a two-stage frequency selection method and device for microwave frequency sweep data. The method includes: acquiring microwave frequency sweep data; performing frequency selection on the microwave frequency sweep data by using a random forest-recursive feature elimination algorithm, taking a preset parameter in the random forest-recursive feature elimination algorithm as a hyper-parameter, changing the value of the hyper-parameter, and generating a series of candidate frequency subsets within different frequencies; building prediction models on the basis of the frequency sweep data corresponding to the candidate frequency subsets of different frequencies; evaluating the performance of each prediction model by means of 10 fold cross validation, and calculating evaluation index
(Continued)

values of model performance; and taking the evaluation indexes as a voting basis, and selecting an optimal frequency subset by using a majority voting method.

4 Claims, 6 Drawing Sheets

(51) Int. Cl.
*G06F 18/20* (2023.01)
*G06F 18/2451* (2023.01)
*G06N 20/00* (2019.01)

(58) Field of Classification Search
CPC ................. G06F 18/2451; G06F 18/29; G06F 18/24323; G01N 22/04
See application file for complete search history.

(56) References Cited

FOREIGN PATENT DOCUMENTS

| | | | | |
|---|---|---|---|---|
| CN | 109632834 A | | 4/2019 | |
| CN | 111239166 A | | 6/2020 | |
| CN | 111812122 A | | 10/2020 | |
| CN | 112070103 A | * | 12/2020 | ....... G06F 18/24323 |
| JP | 2010537766 A | | 12/2010 | |
| JP | 2014032059 A | | 2/2014 | |
| JP | 2015152397 A | | 8/2015 | |
| JP | 2017075945 A | | 4/2017 | |

OTHER PUBLICATIONS

B. Venkatesh; A Hybrid Feature Selection Approach for Handling a High-Dimensional Data (Year: 2019).*
First Office Action(JP2022-527042); Date of Mailing: Jun. 5, 2023.
International Search Report (PCT/CN2021/096341); Date of Mailing: Aug. 16, 2021.
CN First Office Action(202010542110.6); Date of Mailing: Mar. 22, 2021.
Recursive—feature—elimination—with—random—forest—for—PTR—MS—analysis—of—agroindustrial—products.
Development—of—Multifrequency—Swept—Microwave—Sensing—System—for—Moisture—Measurement—of—Sweet—Corn—With—Deep—Neural—Network.
Study—on—Viscosity—Index—Prediction—of—VGO—by—Near—Infrared—Spectroscopy.

* cited by examiner

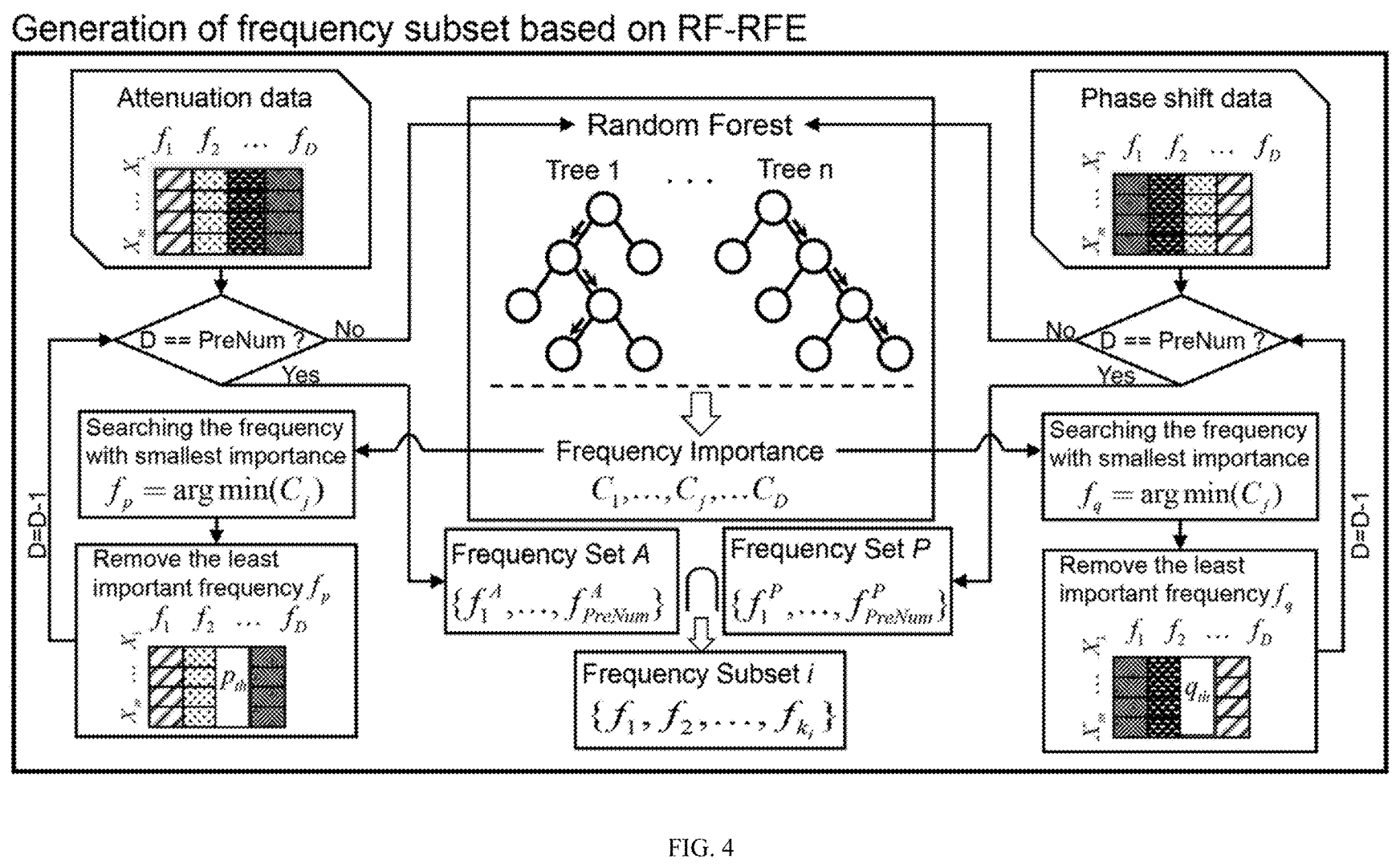

Generation of frequency subset based on RF-RFE

Attenuation data $f_1\ f_2\ \ldots\ f_D$ $p_m$

Phase shift data $f_1\ f_2\ \ldots\ f_D$ $q_m$

D == PreNum ?

No

Yes

Searching the frequency with smallest importance $f_p = \arg\min(C_j)$

Remove the least important frequency $f_p$

Searching the frequency with smallest importance $f_q = \arg\min(C_j)$

Remove the least important frequency $f_q$

D=D-1

Random Forest

Tree 1

Tree n

Frequency Importance $C_1,\ldots,C_j,\ldots,C_D$

Frequency Set A $\{f_1^A,\ldots,f_{PreNum}^A\}$

Frequency Set P $\{f_1^P,\ldots,f_{PreNum}^P\}$

Frequency Subset i $\{f_1,f_2,\ldots,f_{k_i}\}$

FIG. 4

TWO-STAGE FREQUENCY SELECTION METHOD AND DEVICE FOR MICROWAVE FREQUENCY SWEEP DATA

CROSS-REFERENCE TO RELATED APPLICATIONS

The present application is a continuation of International Application No. PCT/CN2021/096341, filed on May 27, 2021, which claims priority to Chinese Application No. 202010542110.6, filed on Jun. 15, 2020, the contents of both of which are incorporated herein by reference in their entireties.

TECHNICAL FIELD

The present disclosure relates to material quality test, in particular to a two-stage frequency selection method and device for microwave frequency sweep data.

BACKGROUND

Electromagnetic parameters (such as dielectric constant) of a material are composite functions of material composition, structure, uniformity, orientation, water content and other factors. Microwave nondestructive testing (MNDT) technology can measure material properties related to dielectric properties, such as moisture content, according to changes in microwave amplitude, phase and other parameters. The microwave testing method for material moisture content has the advantages of non-contact measurement, wide measurement range, high precision, good reliability, strong anti-interference ability, and easy implementation of online real-time measurement, so it is a desired moisture content measurement method.

CN200920033543.8 proposes a device for measuring the moisture content of a fabric according to changes in microwave attenuation, which only uses microwaves of a single frequency. In documents, Miao Jianjun et al. stated that the single-frequency microwave measurement system is prone to adverse effects such as multiple reflections, interference and resonance, whereas broadband scanning technology can overcome such shortcomings. Menke et al. also experimentally demonstrated in documents that the use of multiple measurement frequencies in a relatively wide frequency band can help improve the accuracy of predicting the moisture content of a high-humidity material. CN201910064268.4 proposes a method for measuring the moisture content of grains based on microwave frequency sweep technology. In free space transmission measurement, frequency sweep signals are used as measurement signals to suppress the effects of multiple reflections generated in the measurement process on attenuation and phase shift measurement. In documents, XuHao et al. mentioned that below 10 GHz, the attenuation of microwaves is greatly affected by the salt content and the like in water, while the attenuation can be ignored above this frequency. Because of this characteristic, the microwaves of 10 GHz have been widely used in moisture measurement. However, signals of multiple frequencies beyond 10 GHz, such as 4.9 GHz, 5.8 GHz, and 14.2 GHz, were used in the articles published by Samir Trabelsi and other researchers in the U.S. Department of Agriculture. In their articles, they did not explain in detail the reasons for using these frequency signals, and did not explain whether the use of these frequency signals was related to the working frequency of test equipment, or whether these frequency signals were selected from the measured material itself. In the research of domestic scholars, 10 GHz is generally used as the measurement frequency. Okabe stated in a document that each component in a material has different effects on microwave signals, and each material has its own unique composition, so it is not a good practice to use the same frequency to measure the moisture contents of different materials. In addition, the microwave characteristics (such as attenuation and phase shift) measured at each frequency will not change sensitively with the moisture content of the material, that is, the moisture content of the material cannot be distinguished at some frequencies, so these invalid frequencies should be removed in later test, the corresponding microwave attenuation and phase shift data will no longer be measured at these frequencies, and noise data can be removed. Therefore, after the introduction of frequency sweep technology, a method is urgently needed to establish a complete rule to select a best group of measurement frequencies according to the correlation between characteristic frequency sweep data and material target attributes.

SUMMARY

The objective of the embodiments of the present disclosure is to provide a two-stage frequency selection method and device for microwave frequency sweep data, to solve the existing problem of lack of a complete frequency selection method capable of removing inferior measurement frequencies in microwave frequency sweep signals that will introduce noise and redundant data.

In order to achieve the above objective, the technical solutions adopted in the embodiments of the present disclosure are:

In a first aspect, an embodiment of the present disclosure provides a two-stage frequency selection method for microwave frequency sweep data, including:

Acquiring microwave frequency sweep data.

Performing frequency selection on the microwave frequency sweep data by using a random forest-recursive feature elimination algorithm, taking a preset parameter in the random forest-recursive feature elimination algorithm as a hyper-parameter, changing the value of the hyper-parameter, and generating a series of candidate frequency subsets within different frequencies.

Building prediction models on the basis of the frequency sweep data corresponding to the candidate frequency subsets of different frequencies.

Evaluating the performance of each prediction model by means of 10 fold cross validation, and calculating evaluation index values of model performance.

Taking the evaluation indexes as a voting basis, and selecting an optimal frequency subset by using a majority voting method.

Further, after acquiring the microwave frequency sweep data, the method further includes:

Normalizing the microwave frequency sweep data, and then dividing out an attenuation training data set and a phase shift training data set.

Further, both the attenuation frequency sweep data set and the phase shift frequency sweep data set exist in the form of a data table, the vertical direction of the data table represents a frequency domain $\{f_1, f_2, K, f_i, K, f_n\}$, the horizontal direction represents a sample domain $\{X_1, X_2, K, X_j, K, X_m\}$, and the corresponding data elements are attenuation values A or phase shift values Phi.

Further, performing frequency selection on the microwave frequency sweep data by using a random forest-recursive feature elimination algorithm, taking a preset parameter in the random forest-recursive feature elimination algorithm as a hyper-parameter, changing the value of the hyper-parameter, and generating a series of candidate frequency subsets within different frequencies includes:

Performing feature selection on the attenuation training data set and the phase shift training data set respectively by using the random forest-recursive feature elimination algorithm to obtain a frequency set selected on the basis of the attenuation training data set and a frequency set selected on the basis of the phase shift training data set, taking the intersection of the two frequency sets to obtain a candidate frequency subset, taking the preset parameter in the random forest-recursive feature elimination algorithm as a hyper-parameter, changing the value of the hyper-parameter, repeating the process of obtaining the candidate frequency subset, and generating a series of candidate frequency subsets within different frequencies.

Further, performing frequency selection on the microwave frequency sweep data by using a random forest-recursive feature elimination algorithm, taking a preset parameter in the random forest-recursive feature elimination algorithm as a hyper-parameter, changing the value of the hyper-parameter, and generating a series of candidate frequency subsets within different frequencies includes:

(2.1) Training a sample attribute prediction model on the attenuation training data set by using the random forest algorithm.

(2.2) Obtaining the importance of attenuation features corresponding to each frequency, sorting the frequencies according to the importance of features, and finding out frequencies with the lowest importance of the corresponding features.

(2.3) Removing attenuation feature data corresponding to the frequencies with the lowest importance of the corresponding attenuation features from the attenuation training data set, and retraining the sample attribute prediction model on the updated attenuation training data set by using the random forest algorithm.

(2.4) Repeating steps (2.2) and (2.3) until only the data corresponding to PreNum frequencies remain in the attenuation training data set, and recording the set consisting of the PreNum frequencies as a frequency set $F_A$.

(2.5) Training a sample attribute prediction model on the phase shift training data set by using the random forest algorithm.

(2.6) Obtaining the importance of phase shift features corresponding to each frequency, sorting the frequencies according to the importance of features, and finding out frequencies with the lowest importance of the corresponding features.

(2.7) Removing phase shift feature data corresponding to the frequencies with the lowest importance of the corresponding phase shift features from the phase shift training data set, and retraining the sample attribute prediction model on the updated phase shift training data set by using the random forest algorithm.

(2.8) Repeating steps (2.6) and (2.7) until only the data corresponding to PreNum frequencies remain in the phase shift training data set, and recording the set consisting of the PreNum frequencies as a frequency set $F_P$.

(2.9) Taking the intersection of the frequency set $F_A$ and the frequency set $F_P$ to obtain a candidate frequency subset $F_{sub}$.

(2.10) Changing the value of the preset parameter PreNum of the random forest-recursive feature elimination algorithm, and repeating steps (2.1) to (2.9) to obtain a series of candidate frequency subsets within different frequencies.

Further, building prediction models on the basis of the frequency sweep data corresponding to the candidate frequency subsets of different frequencies includes:

Each candidate frequency subset corresponding to a frequency sequence number subset, extracting corresponding data from the attenuation training data set and the phase shift training data set respectively by using the frequency sequence number subsets, and combining the two parts of data into attenuation-phase shift frequency sweep data sets.

Taking each attenuation-phase shift frequency sweep data set as input data and sample attribute values as output data, and building prediction models for the sample attribute values by using learning algorithms.

Further, each candidate frequency subset corresponding to a frequency sequence number subset, extracting corresponding data from the attenuation training data set and the phase shift training data set respectively by using the frequency sequence number subsets, and combining the two parts of data into attenuation-phase shift frequency sweep data sets, which includes:

(4.1) Searching for the sequence number of each frequency in the candidate frequency subset in the normalized attenuation frequency sweep data set or phase shift frequency sweep data set to form a frequency sequence number subset.

(4.2) Repeating step (4.1) until the frequency sequence number subset corresponding to each candidate frequency subset in step (3) is obtained.

(4.3) Extracting corresponding data from the attenuation training data set according to the frequency sequence number subset.

(4.4) Extracting corresponding data from the phase shift training data set according to the frequency sequence number subset.

(4.5) Vertically splicing the two parts of data extracted from the attenuation training data set and the phase shift training data set respectively to obtain an attenuation-phase shift frequency sweep data set corresponding to the candidate frequency sub set.

(4.6) Repeating steps (4.3)-(4.5) until a corresponding attenuation-phase shift frequency sweep data set is obtained for each candidate frequency subset.

Further, taking the evaluation indexes as a voting basis, and selecting an optimal frequency subset by using a majority voting method includes:

Taking the evaluation indexes as a voting basis, by using the majority voting method, selecting an optimal prediction model obtaining an attenuation-phase shift frequency sweep data set corresponding to the optimal prediction model, and then obtaining a frequency subset corresponding to the attenuation-phase shift frequency sweep data set, that is, the optimal frequency subset.

Further, taking the evaluation indexes as a voting basis, and selecting an optimal frequency subset by using a majority voting method includes:

(6.1) Using $R^2$ as an index of the voting basis, selecting top k models with the maximum $R^2$ value under each of T algorithms, obtaining a frequency subset corresponding to each model, and selecting a frequency subset with the most votes by using the majority voting method on the T×k candidate results, denoted as $$F_{opt}^{R^2}.$$

(6.2) Using RMSE as an index of the voting basis, selecting top k models with the minimum RMSE value under each of T algorithms, obtaining a frequency subset corresponding to each model, and selecting a frequency subset with the most votes by using the majority voting method on the T×k candidate results, denoted as $$F_{opt}^{RMSE}.$$

(6.3) Using MAE as an index of the voting basis, selecting top k models with the minimum MAE value under each of T algorithms, obtaining a frequency subset corresponding to each model, and selecting a frequency subset with the most votes by using the majority voting method on the T×k candidate results, denoted as $$F_{opt}^{MAE}.$$

(6.4) Using the majority voting method to synthesize the optimal frequency sets $$F_{opt}^{R^2}, F_{opt}^{RMSE} \text{ and } F_{opt}^{MAE}$$

respectively selected on the basis of the three regressive evaluation indexes, and selecting a final optimal frequency set $F_{opt}$, or selecting the frequency set within the least number of frequencies as the optimal frequency set $F_{opt}$ if the same vote situations occur.

On another aspect, an embodiment of the present disclosure further provides a two-stage frequency selection device for microwave frequency sweep data, including:

An acquisition module, configured to acquire microwave frequency sweep data;

A generation module, configured to perform frequency selection on the microwave frequency sweep data by using a random forest-recursive feature elimination algorithm, take a preset parameter in the random forest-recursive feature elimination algorithm as a hyper-parameter, change the value of the hyper-parameter, and generate a series of candidate frequency subsets within different frequencies.

A building module, configured to build prediction models on the basis of the frequency sweep data corresponding to the candidate frequency subsets of different frequencies.

A calculation module, configured to evaluate the performance of each prediction model by means of 10 fold cross validation, and calculate evaluation index values of model performance.

A selection module, configured to take the evaluation indexes as a voting basis, and select an optimal frequency subset by using a majority voting method.

According to the above technical solution, the two-stage frequency selection method proposed in the embodiment of the present disclosure fills the gap of frequency selection based on microwave frequency sweep data. The method optimizes measurement frequencies involved in frequency sweep signals, removes the frequencies that will introduce noise data and redundant data, filters out optimal measurement frequencies, that is, an optimal frequency set, and reconstructs frequency sweep signals. For the preset parameter PreNum that depends on prior knowledge in the random forest-recursive feature elimination algorithm, that is, the number of features to be selected in the algorithm, PreNum is no longer artificially specified as a fixed value, but the parameter PreNum is taken as a hyper-parameter. By changing the value of PreNum, performing the random forest-feature recursive elimination algorithm multiple times, generating multiple candidate frequency subsets correspondingly, and then selecting an optimal frequency set in combination with a voting rule, the value of PreNum is no longer artificially specified, and the ambiguity and subjectivity during feature selection are eliminated.

BRIEF DESCRIPTION OF DRAWINGS

The accompanying drawings described herein are used to provide further understanding of the present disclosure and constitute a part of the present disclosure. The exemplary embodiments of the present disclosure and their descriptions are used to explain the present disclosure and do not constitute improper limitations of the present disclosure. In the drawings:

FIG. 4 is a specific flowchart of a first stage of the frequency selection method, i.e., generating candidate frequency subsets by using the RF-RFE algorithm according to an embodiment of the present disclosure;

DESCRIPTION OF EMBODIMENTS

In order to make the objectives, technical solutions and advantages of the present disclosure clearer, the technical solutions of the present disclosure will be clearly and completely described below with reference to the specific embodiments of the present disclosure and the corresponding drawings. Obviously, the described embodiments are only a part of the embodiments of the present disclosure, not all of them. Based on the embodiments in the present disclosure, all other embodiments obtained by those of ordinary skill in the art without any creative efforts shall fall within the protection scope of the present disclosure.

Embodiment 1

Figure 1:
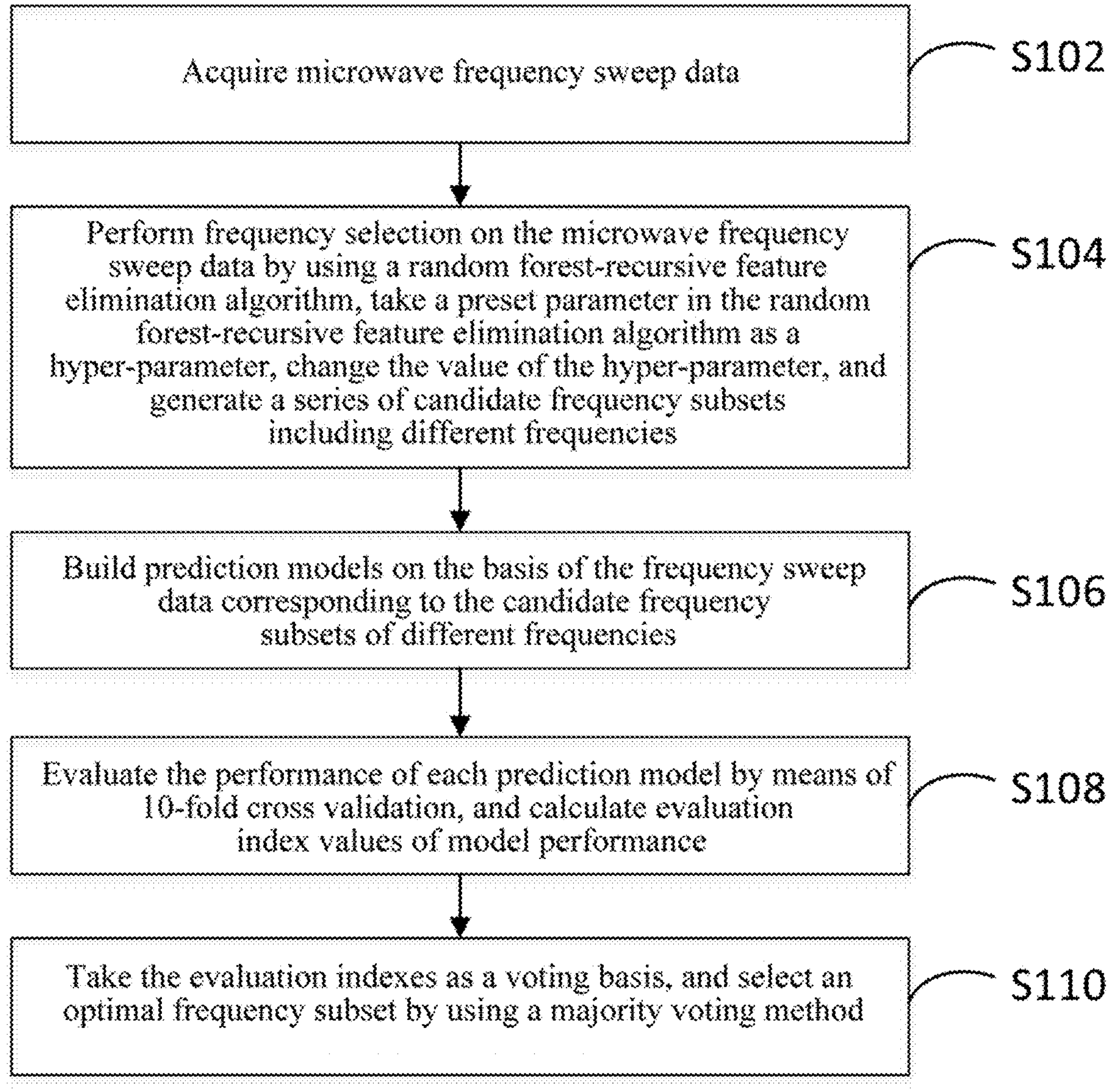
FIG. 1 is a flowchart of a two-stage frequency selection method for microwave frequency sweep data according to an embodiment of the present disclosure.
Figure 2:
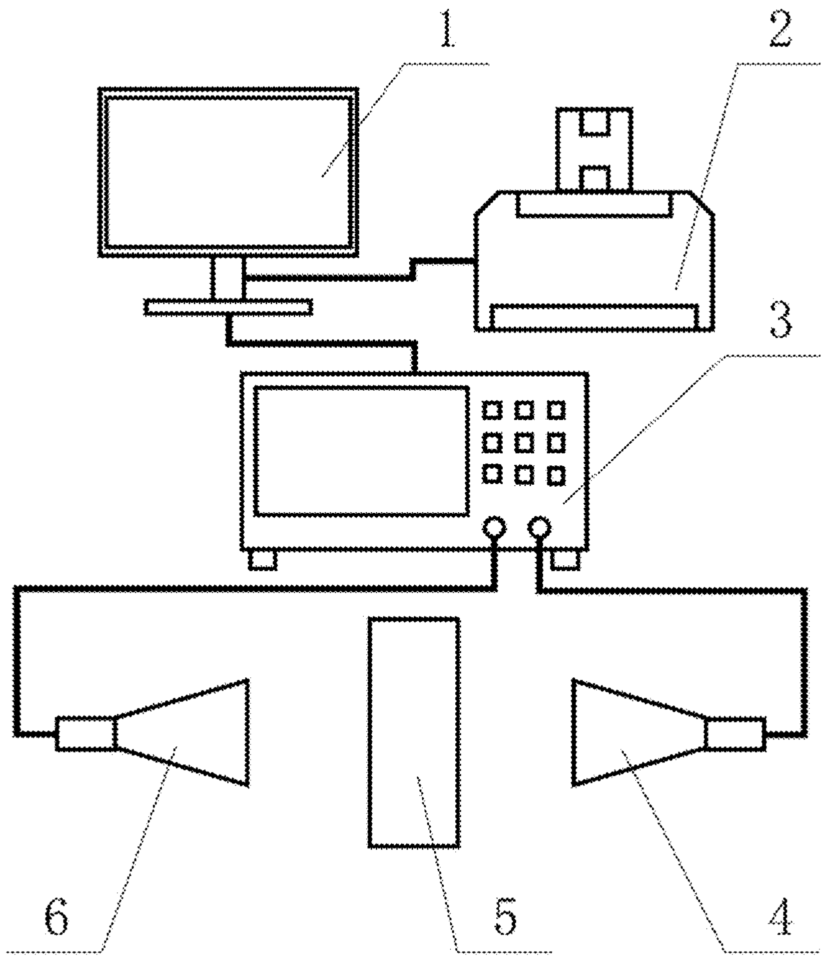
FIG. 2 is a schematic diagram of a general test device that can be used to measure microwave attenuation and phase shift frequency sweep data according to an embodiment of the present disclosure, where computer 1, data storage device 2, vector network analyzer 3, receiving horn antenna 4, measured material 5, transmitting horn antenna 6.

FIG. 1 is a flowchart of a two-stage frequency selection method for microwave frequency sweep data according to an embodiment of the present disclosure. This embodiment provides a two-stage frequency selection method for microwave frequency sweep data. The method is mainly applicable to measuring the moisture content (of course, it can also be other attributes) of a material by a microwave method, evaluating the merits of measurement frequencies according to the material itself, and selecting an optimal measurement frequency for the microwave testing of the moisture content of the material. The method is an important method to improve the measurement accuracy of the moisture content of the material. The method may include the following steps:

Step S102, microwave frequency sweep data is acquired;

In the embodiment, the test device shown in FIG. 2 includes a computer 1, a data storage device 2, a vector network analyzer 3, a receiving horn antenna 4, a measured material 5 and a transmitting horn antenna 6. The computer 1 is connected to the data storage device 2 by a data line, and stores the acquired microwave frequency sweep measurement data in the data storage device 2. The vector network analyzer 3 is connected to the computer 1 by a data line, and uploads the acquired microwave frequency sweep measurement data to the computer 1. The vector network analyzer 3 is respectively connected to the receiving horn antenna 4 and the transmitting horn antenna 6 by two test cables, the receiving horn antenna 4 and the transmitting horn antenna 6 are symmetrically arranged on the left and right sides of the measured material 5, the transmitting horn antenna 6 is used to transmit microwave signals to the measured material 5, and the receiving horn antenna 4 is used to receive the microwave signals transmitted through the measured material 5. Frequency sweep measurement is performed on corn samples to be tested by using the test device shown in FIG. 2 to obtain frequency sweep data about microwave attenuation and phase shift, and the real moisture contents of the corn samples are measured as label data. In this embodiment, corn grains with different moisture contents are used as experimental subjects. 40 kinds of corn samples with different moisture contents are obtained by natural drying, and the moisture contents of the samples range from 11% w.b. (dry corn) to 63% w.b. (fresh corn). The operating frequency range of the vector network analyzer 3 is set to 2-10 GHz, and the frequency sweep signals include 801 frequencies at 10 MHz intervals. First, no-load measurement is performed without placing the corn samples to obtain reference values for calculating microwave attenuation and phase shift. After that, the corn sample of each moisture content is repeatedly measured 5 times, and actual microwave attenuation and phase shift frequency sweep data is calculated in combination with the reference values of microwave attenuation and phase shift provided by the no-load measurement. After the frequency sweep measurement of the corn sample of each moisture content, a small part of the corn samples are taken out, and the real moisture contents of the corn samples are measured according to the method provided in the current national standard GB/T 10362-2008. A total of 200 groups of attenuation frequency sweep data and 200 groups of phase shift frequency sweep data are obtained from the 40 kinds of corn samples with different moisture contents in the test, and constitute an attenuation frequency sweep data set $A_{original}$ and a phase shift frequency sweep data set $P_{original}$ respectively. The effect of step S102 is to obtain microwave frequency sweep data for subsequent frequency selection.

Step S103, after the microwave frequency sweep data is acquired, the method further includes:

The microwave frequency sweep data is normalized, and then an attenuation training data set and a phase shift training data set are divided out.

In an embodiment, z-score normalization is performed on the original attenuation frequency sweep data set $A_{original}$ and phase shift frequency sweep data set $P_{original}$, and the specific formula is as follows:

$$x^* = \frac{x-m}{s}$$

In the formula, x* is the normalized data, x is the original data, m represents a mean value of the data, and s represents a variance of the data. Normalized frequency sweep data sets $A_{normalization}$ and $P_{normalization}$ are obtained; 70% of the frequency sweep data is randomly divided out from the $A_{normalization}$ and combined into an attenuation training data set $A_{training}$; and 70% of the frequency sweep data is randomly divided out from the $P_{normalization}$ and combined into a phase shift training data set $P_{training}$.

Both the attenuation frequency sweep data set and the phase shift frequency sweep data set exist in the form of a data table, the vertical direction of the data table represents a frequency domain $\{f_1, f_2, K, f_i, K, f_n\}$, the horizontal direction represents a sample domain $\{X_1, X_2, K, X_j, K, X_m\}$, and the corresponding data elements are attenuation values A or phase shift values Phi.

The data normalization belongs to the category of data non-dimensionalization. The effect of step S103 is to convert data of different specifications to the same specification, which will help model training.

Figure 3:
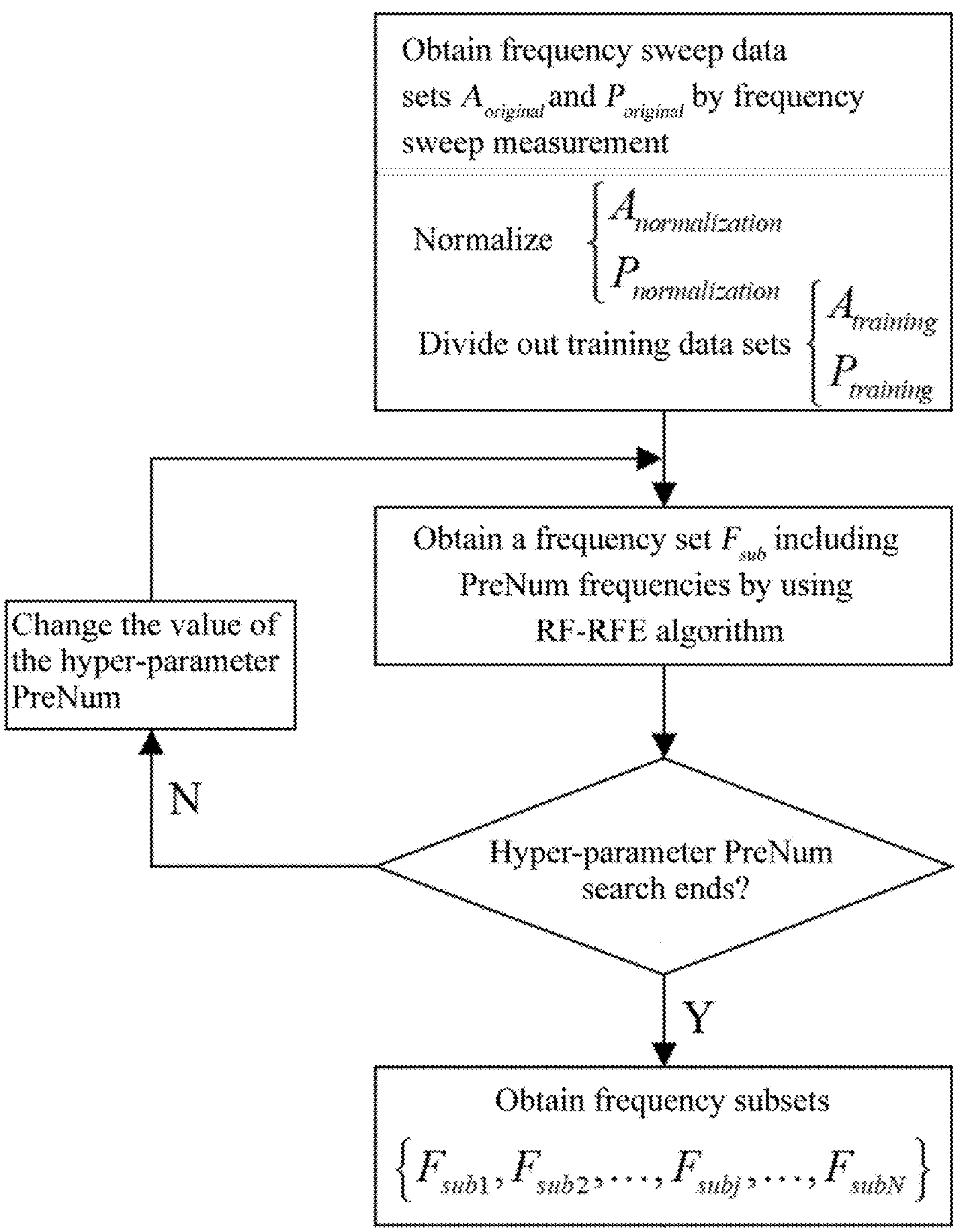
FIG. 3 is a flowchart of generating candidate frequency subsets by using an RF-RFE algorithm according to an embodiment of the present disclosure.

Step S104, frequency selection is performed on the microwave frequency sweep data by using a random forest-recursive feature elimination algorithm, a preset parameter in the random forest-recursive feature elimination algorithm is taken as a hyper-parameter, the value of the hyper-parameter is changed, and a series of candidate frequency subsets within different frequencies are generated;

In an embodiment, feature selection is performed on the attenuation training data set and the phase shift training data set respectively by using the random forest-recursive feature elimination algorithm to obtain a frequency set selected on the basis of the attenuation training data set and a frequency set selected on the basis of the phase shift training data set, the intersection of the two frequency sets is taken to obtain a candidate frequency subset, as shown in FIG. 3, the preset parameter in the random forest-recursive feature elimination algorithm is taken as a hyper-parameter, the value of the hyper-parameter is changed, the process of obtaining the candidate frequency subset is repeated, and a series of candidate frequency subsets within different frequencies are generated.

Further, the specific process of this step is shown in FIG. 4, and specifically includes:

(2.1) A sample attribute prediction model is trained on the attenuation training data set by using the random forest algorithm.

(2.2) The importance of attenuation features corresponding to each frequency is obtained, the frequencies are sorted according to the importance of features, and frequencies with the lowest importance of the corresponding features are found out.

(2.3) Attenuation feature data corresponding to the frequencies with the lowest importance of the corresponding attenuation features is removed from the attenuation training data set, and the sample attribute prediction model is retrained on the updated attenuation training data set by using the random forest algorithm.

(2.4) Steps (2.2) and (2.3) are repeated until only the data corresponding to PreNum frequencies remain in the attenuation training data set, and the set consisting of the PreNum frequencies is recorded as a frequency set $F_A$.

(2.5) A sample attribute prediction model is trained on the phase shift training data set by using the random forest algorithm.

(2.6) The importance of phase shift features corresponding to each frequency is obtained, the frequencies are sorted according to the importance of features, and frequencies with the lowest importance of the corresponding features are found out.

(2.7) Phase shift feature data corresponding to the frequencies with the lowest importance of the corresponding phase shift features is removed from the phase shift training data set, and the sample attribute prediction model is retrained on the updated phase shift training data set by using the random forest algorithm.

(2.8) Steps (2.6) and (2.7) are repeated until only the data corresponding to PreNum frequencies remain in the phase shift training data set, and the set consisting of the PreNum frequencies is recorded as a frequency set $F_P$.

(2.9) The intersection of the frequency set $F_A$ and the frequency set $F_P$ is taken to obtain a candidate frequency subset $F_{sub}$.

(2.10) The value of the preset parameter PreNum of the random forest-recursive feature elimination algorithm is changed, and steps (2.1) to (2.9) are repeated to obtain a series of candidate frequency subsets within different frequencies.

The effect of step S104 is, on the basis of the attenuation training data set and the phase shift training data set obtained in step S103, generating candidate frequency subsets by using the random forest-recursive feature elimination algorithm.

Step S105, prediction models are built on the basis of the frequency sweep data corresponding to the candidate frequency subsets of different frequencies.

In an embodiment, this step includes two sub-steps:

Step S1051, each candidate frequency subset corresponds to a frequency sequence number subset, corresponding data is extracted from the attenuation training data set and the phase shift training data set respectively by using the frequency sequence number subsets, and the two parts of data are combined into attenuation-phase shift frequency sweep data sets; specifically, this step specifically includes:

(4.1) The sequence number of each frequency in the candidate frequency subset is searched in the normalized attenuation frequency sweep data set or phase shift frequency sweep data set to form a frequency sequence number subset.

(4.2) Step (4.1) is repeated until the frequency sequence number subset corresponding to each candidate frequency subset in step (3) is obtained.

(4.3) Corresponding data is extracted from the attenuation training data set according to the frequency sequence number subset.

(4.4) Corresponding data is extracted from the phase shift training data set according to the frequency sequence number subset.

(4.5) The two parts of data extracted from the attenuation training data set and the phase shift training data set respectively are vertically spliced to obtain an attenuation-phase shift frequency sweep data set corresponding to the candidate frequency subset.

(4.6) Steps (4.3)-(4.5) are repeated until a corresponding attenuation-phase shift frequency sweep data set is obtained for each candidate frequency subset.

Step S1052, each attenuation-phase shift frequency sweep data set is taken as input data, sample attribute values are taken as output data, and prediction models are built for the sample attribute values by using learning algorithms.

Figure 5:
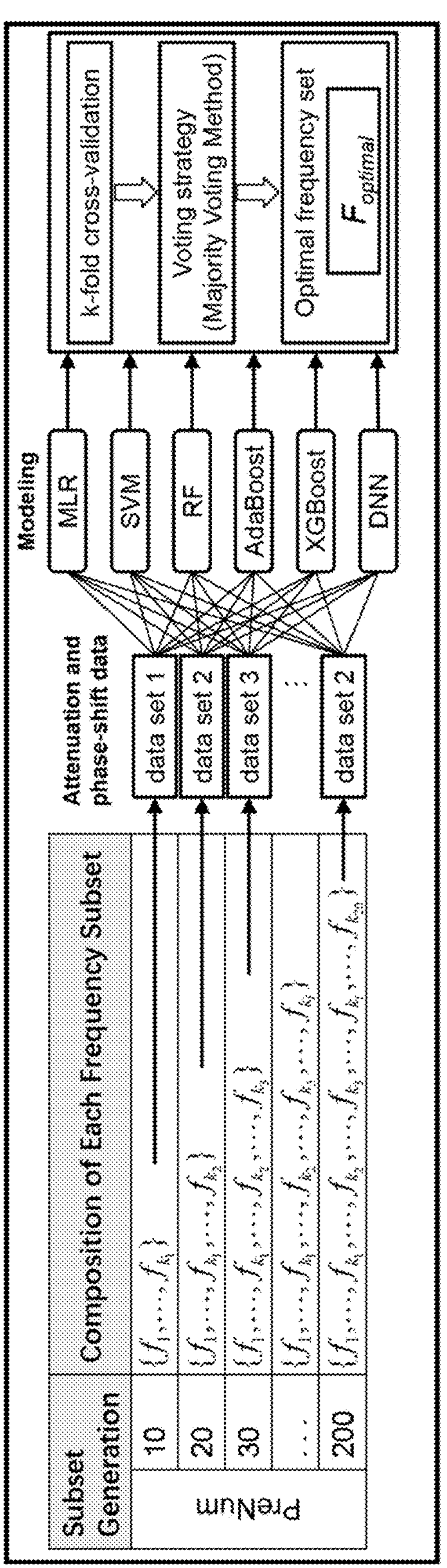
FIG. 5 is a specific flowchart of a second stage of the frequency selection method, i.e., selecting an optimal frequency set by using a voting method MVM according to an embodiment of the present disclosure.

In an embodiment, as shown in FIG. 5, a corn moisture content prediction model is trained on the basis of 20 attenuation-phase shift frequency sweep data sets $\{AP_1, AP_2, K, AP_j, K, AP_{20}\}$ and corn moisture content data respectively by using six regression learning algorithms (including multiple linear regression (MLR), support vector machine regression (SVM), random forest regression (RF), adaptive boosting regression (AdaBoost), extreme gradient boosting regression (XGBoost) and a deep neural network (DNN)), to obtain 6×20 regression models;

The effect of step S105 is, on the basis of the generated candidate frequency subsets, combining the obtained original microwave frequency sweep data into corresponding attenuation-phase shift frequency sweep data sets, and then building models by using different regression algorithms.

Step S106, the performance of each prediction model is evaluated by means of 10 fold cross validation, and evaluation index values of model performance are calculated.

In an embodiment, as shown in FIG. 5, the performance of each model is evaluated by means of 10 fold cross validation technology, and three regressive evaluation indexes including a determination coefficient $R^2$, a root mean square error (RMSE) and a mean absolute error (MAE) are calculated to quantitatively describe the performance of each model. The calculation formulas are as follows:

The determination coefficient $R^2$ is:

$$R^2(y, \hat{y}) = \frac{SSR}{SST}$$

$$SST = \overset{m}{\underset{i}{å}}(y_i - \overline{y})^2$$

$$SSR = \overset{m}{\underset{i}{å}}(\hat{y}_i - \overline{y})^2$$

The RMSE is:

$$RMSE(y, \hat{y}) = \sqrt{\frac{1}{m}\overset{m}{\underset{i=1}{å}}\left(y_i - \hat{y}_i\right)^2}$$

The MAE is:

$$MAE(y, \hat{y}) = \frac{1}{m}\overset{m}{\underset{i=1}{å}}|y_i - \hat{y}_i|$$

Where $y_i$ is the real moisture content of a corn sample, $\hat{y}_i$ is a predicted value of the moisture content of the corn sample, $\overline{y}$ is a mean value of the moisture contents of the corn samples, SST is a sum of squares of total deviations, and SSR is a sum of squares of regression.

Step S110, the evaluation indexes are taken as a voting basis, and an optimal frequency subset is selected by using a majority voting method.

In an embodiment, the evaluation indexes are taken as a voting basis, an optimal prediction model is selected by using the majority voting method, an attenuation-phase shift frequency sweep data set corresponding to the optimal prediction model is obtained, and then a frequency subset corresponding to the attenuation-phase shift frequency sweep data set, that is, the optimal frequency subset, is obtained. More specifically, this step includes:

(6.1) In the embodiment, $R^2$ is first used as an index of the voting basis, top 5 models with the maximum $R^2$ value are selected under each algorithm, a frequency subset sequence number corresponding to each model is obtained, a frequency subset with the most votes is selected by using the voting method MVM on the 6×5 candidate results, as shown in Table 1, the 3rd frequency subset $F_{sub3}$ obtains the most votes;

(6.2) Then RMSE is used as an index of the voting basis, top 5 models with the minimum RMSE value are selected under each algorithm, a frequency subset sequence number corresponding to each model is obtained, a frequency subset with the most votes is selected by using the voting method MVM on the 6×5 candidate results, as shown in Table 1, the 3rd and 4th frequency subsets $F_{sub3}$ and $F_{sub4}$ obtain the most votes at the same time;

(6.3) Finally, MAE is used as an index of the voting basis, and top 5 models with the minimum MAE value are selected under each algorithm, a frequency subset sequence number corresponding to each model is obtained, a frequency subset with the most votes is selected by using the voting method MVM on the 6×5 candidate results, as shown in Table 1, the 3rd and 4th frequency subsets $F_{sub3}$ and $F_{sub4}$ obtain the most votes again at the same time.

(6.4) The optimal frequency set is selected after two times of voting for the following reasons:

1. The frequency subset $F_{sub3}$ is selected as the optimal frequency set under the three evaluation indexes.
2. The frequency subset $F_{sub3}$ involve fewer measurement frequencies than the frequency subset $F_{sub\ 4}$.

Therefore, the frequency subset $F_{sub3}$ is selected as the final optimal frequency set.

TABLE 1

Results of selecting optimal frequency sets from candidate frequency subsets by using the voting method MVM.

| Evaluation index | Regression algorithm | Sequence numbers of top 5 frequency subsets: Top 1 | Top 2 | Top 3 | Top 4 | Top 5 | Optimal frequency subset sequence number |
|---|---|---|---|---|---|---|---|
| $R^2$ | MLR | 4 | 12 | 8 | 3 | 6 | 3 |
| | SVM | 4 | 3 | 5 | 2 | 1 | |
| | RF | 5 | 16 | 17 | 12 | 3 | |
| | AdaBoost | 16 | 5 | 7 | 1 | 10 | |
| | XGBoost | 2 | 1 | 3 | 4 | 17 | |
| | DNN | 8 | 14 | 4 | 3 | 7 | |
| RMSE | MLR | 4 | 12 | 8 | 3 | 6 | 3a 4a |
| | SVM | 4 | 3 | 5 | 2 | 1 | |
| | RF | 5 | 3 | 17 | 12 | 4 | |
| | AdaBoost | 5 | 7 | 1 | 16 | 10 | |
| | XGBoost | 2 | 1 | 3 | 4 | 17 | |
| | DNN | 8 | 14 | 7 | 4 | 3 | |
| MAE | MLR | 12 | 7 | 11 | 6 | 8 | 3a 4a |
| | SVM | 5 | 4 | 3 | 6 | 2 | |
| | RF | 3 | 5 | 17 | 4 | 14 | |
| | AdaBoost | 5 | 16 | 7 | 10 | 1 | |
| | XGBoost | 2 | 1 | 4 | 3 | 17 | |
| | DNN | 14 | 7 | 8 | 3 | 4 | |

[a] indicates that the frequency subset obtains the same votes as the other frequency subset The effect of step S110 is to complete the selection of the optimal frequency set by using the majority voting method (MVM).

Embodiment 2

Figure 6:
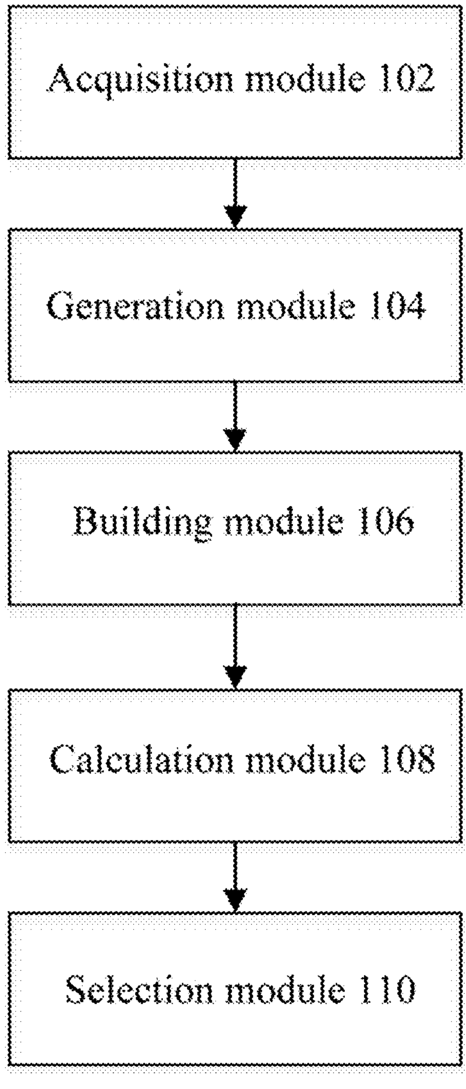
FIG. 6 is a block diagram of a two-stage frequency selection device for microwave frequency sweep data according to an embodiment of the present disclosure.

As shown in FIG. 6, this embodiment provides a two-stage frequency selection device for microwave frequency sweep data. The device is a virtual device for the two-stage frequency selection method for microwave frequency sweep data described in the above embodiment. The device includes:

an acquisition module 102, configured to acquire microwave frequency sweep data;

a generation module 104, configured to perform frequency selection on the microwave frequency sweep data by using a random forest-recursive feature elimination algorithm, take a preset parameter in the random forest-recursive feature elimination algorithm as a hyper-parameter, change the value of the hyper-parameter, and generate a series of candidate frequency subsets within different frequencies;

a building module 106, configured to build prediction models on the basis of the frequency sweep data corresponding to the candidate frequency subsets of different frequencies;

a calculation module 108, configured to evaluate the performance of each prediction model by means of 10 fold cross validation, and calculate evaluation index values of model performance; and a selection module 110, configured to take the evaluation indexes as a voting basis, and select an optimal frequency subset by using a majority voting method.

The sequence numbers of the foregoing embodiments of the present disclosure are merely for description, and do not imply the preference among the embodiments.

In the above embodiments of the present disclosure, the description of each embodiment has its own emphasis. For parts that are not described in detail in a certain embodiment, reference may be made to related descriptions of other embodiments.

In the several embodiments provided in the present disclosure, it should be understood that the disclosed technical content can be implemented in other ways. The device embodiment described above is only illustrative. For example, the division of the units may be a logical function division. In actual implementation, there may be other division methods. For example, multiple units or components may be combined or may be integrated into another system, or some features may be ignored or not implemented. On the other hand, the shown or discussed mutual coupling or direct coupling or communication connection may be indirect coupling or communication connection by some interfaces, units or modules, and may be in electrical or other forms.

The units described as separate components may or may not be physically separated, and the components shown as units may or may not be physical units, that is, may be located in one place, or may be distributed to multiple units. The objectives of the solutions of the embodiments may be implemented by selecting part of or all of the units according to actual needs.

In addition, the functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such understanding, the technical solution of the present disclosure substantially, or the part of the present disclosure making contribution to the prior art, or all of or part of the technical solution may be embodied in the form of a software product, and the computer software product is stored in a storage medium, which includes a plurality of instructions enabling a computer device (which may be a personal computer, a server or a network device) to execute all of or part of the steps in the methods of the embodiments of the present disclosure. The aforementioned storage medium includes: various media capable of storing program codes, such as a U disk, a Read-Only Memory (ROM), a Random Access Memory (RAM), a mobile hard disk, a magnetic disk or an optical disk.

Described above are only the preferred embodiments of the present disclosure, and the present disclosure is not limited thereto. Any modifications, equivalent substitutions, improvements, etc. made within the spirit and principle of the present disclosure should be included in the protection scope of the present disclosure.

What is claimed is:

1. A two-stage frequency selection method for microwave frequency sweep data used to detect a material attribute, comprising:

acquiring microwave frequency sweep data collected by a microwave frequency sweep detection system;

normalizing the microwave frequency sweep data, and then partitioning an attenuation training data set and a phase shift training data set, wherein the two data sets exist in the form of a data table, data in a vertical axis of the data table represents a frequency domain $\{f_1, f_2, \ldots, f_i, \ldots, f_n\}$, data in a horizontal axis of the data table represents a sample domain $\{X_1, X_2, \ldots, X_j, \ldots, X_m\}$, and data elements corresponding to the data table are attenuation values A or phase shift values Phi;

by using a random forest-recursive feature elimination algorithm, performing frequency selection on the microwave frequency sweep data, taking a preset parameter in the random forest-recursive feature elimination algorithm as a hyper-parameter, changing the value of the hyper-parameter, and generating a series of candidate frequency subsets within different frequencies sets, wherein the frequency selection step comprises:

(2.1) training, by using the random forest algorithm, a material attribute prediction model on the attenuation training data set;

(2.2) obtaining the importance of attenuation features corresponding to each frequency, sorting the frequencies according to the importance of features, and finding out frequencies with the lowest importance of the corresponding features;

(2.3) removing attenuation feature data corresponding to the frequencies with the lowest importance of the corresponding attenuation features from the attenuation training data set, and retraining the material attribute prediction model on the updated attenuation training data set by using the random forest algorithm;

(2.4) repeating steps (2.2) and (2.3) until only the data corresponding to PreNum frequencies remain in the attenuation training data set, and recording the set consisting of the PreNum frequencies as a frequency set $F_A$, wherein PreNum is a number of features to be selected in the algorithm and may be taken as a hyper-parameter;

(2.5) training a material attribute prediction model on the phase shift training data set by using the random forest algorithm;

(2.6) obtaining the importance of phase shift features corresponding to each frequency, sorting the frequencies according to the importance of features, and finding out frequencies with the lowest importance of the corresponding features;

(2.7) removing phase shift feature data corresponding to the frequencies with the lowest importance of the corresponding phase shift features from the phase shift training data set, and retraining the material attribute prediction model on the updated phase shift training data set by using the random forest algorithm;

(2.8) repeating steps (2.6) and (2.7) until only the data corresponding to PreNum frequencies remains in the phase shift training data set, and recording the set consisting of the PreNum frequencies as a frequency set $F_P$;

(2.9) taking the intersection of the frequency set $F_A$ and the frequency set $F_P$ to obtain a candidate frequency subset $F_{sub}$; and (2.10) changing the value of the preset parameter PreNum of the random forest-recursive feature elimination algorithm, and repeating steps (2.1) to (2.9) to obtain a series of candidate frequency subsets within different frequencies sets;

building the material attribute prediction models on the basis of the frequency sweep data corresponding to the candidate frequency subsets of different frequencies, wherein this step comprises:

each candidate frequency subset corresponding to a frequency sequence number subset, extracting corresponding data from the attenuation training data set and the phase shift training data set respectively by using the frequency sequence number subsets, and combining the two parts of data into attenuation-phase shift frequency sweep data sets; and taking each attenuation-phase shift frequency sweep data set as input data and material attribute values as output data, and building prediction models for the material attribute values by using learning algorithms;

wherein each candidate frequency subset corresponding to a frequency sequence number subset, extracting corresponding data from the attenuation training data set and the phase shift training data set respectively by using the frequency sequence number subsets, and combining the two parts of data into attenuation-phase shift frequency sweep data sets, which comprises:

(4.1) searching for the sequence number of each frequency in the candidate frequency subset in the normalized attenuation frequency sweep data set or phase shift frequency sweep data set to form a frequency sequence number subset;

(4.2) repeating step (4.1) until the frequency sequence number subset corresponding to each candidate frequency subset in step (3) is obtained;

(4.3) extracting corresponding data from the attenuation training data set according to the frequency sequence number subset;

(4.4) extracting corresponding data from the phase shift training data set according to the frequency sequence number subset;

(4.5) concatenating the columns of the two data sets respectively to obtain an attenuation-phase shift frequency sweep data set corresponding to the candidate frequency subset; and (4.6) repeating steps (4.3)-(4.5) until a corresponding attenuation-phase shift frequency sweep data set is obtained for each candidate frequency subset;

evaluating the performance of each prediction model by means of 10 fold cross validation, and calculating evaluation index values of model performance; and taking the evaluation indexes as a voting basis, and selecting an optimal frequency subset by using a majority voting method, which comprises:

(6.1) using $R^2$ as an index of the voting basis, selecting top k models with the maximum $R^2$ value under each of T algorithms, obtaining a frequency subset corresponding to each model, and selecting a frequency subset with the most votes by using the majority voting method on the T×k candidate results, denoted as $$F_{opt}^{R^2};$$

(6.2) using root mean square error (RMSE) as an index of the voting basis, selecting top k models with the minimum RMSE value under each of T algorithms, obtaining a frequency subset corresponding to each model, and selecting a frequency subset with the most votes by using the majority voting method on the T×k candidate results, denoted as $$F_{opt}^{RMSE};$$

(6.3) using mean absolute error (MAE) as an index of the voting basis, selecting top k models with the minimum MAE value under each of T algorithms, obtaining a frequency subset corresponding to each model, and selecting a frequency subset with the most votes by using the majority voting method on the T×k candidate results, denoted as $$F_{opt}^{MAE};$$

and (6.4) using the majority voting method to synthesize the optimal frequency sets $$F_{opt}^{R^2}, F_{opt}^{RMSE} \text{ and } F_{opt}^{MAE}$$

respectively selected on the basis of the three regressive evaluation indexes, and selecting a final optimal frequency set $F_{opt}$, or selecting the frequency set within the least number of frequencies as the optimal frequency set $F_{opt}$ in the event of a tie between optimal frequency values, and constructing a frequency sweep signal using the optimal frequency subset $F_{opt}$, and measuring the material attribute using the frequency sweep signal.

2. The two-stage frequency selection method for microwave frequency sweep data according to claim 1, wherein taking the evaluation indexes as a voting basis, and selecting an optimal frequency subset by using a majority voting method comprises:

taking the evaluation indexes as a voting basis, by using the majority voting method, selecting an optimal prediction model, obtaining an attenuation-phase shift frequency sweep data set corresponding to the optimal prediction model, and then obtaining a frequency subset corresponding to the attenuation-phase shift frequency sweep data set, namely the optimal frequency subset.

3. The two-stage frequency selection method for microwave frequency sweep data according to claim 1, wherein the material attribute comprises material moisture content.

4. The two-stage frequency selection method for microwave frequency sweep data according to claim 1, wherein the microwave frequency sweep data are frequency sweep data about microwave attenuation and phase shift after transmitting through the measured material, with a frequency range of 2 GHz-10 GHz and a frequency sweep interval of 10 MHz.

* * * * *